United States Patent [19]
Current

[11] Patent Number: 5,110,487
[45] Date of Patent: May 5, 1992

[54] ENHANCED OIL RECOVERY METHOD USING SURFACTANT COMPOSITIONS FOR IMPROVED OIL MOBILITY

[75] Inventor: Steven P. Current, Novato, Calif.

[73] Assignee: Chevron Corporation, San Francisco, Calif.

[21] Appl. No.: 622,197

[22] Filed: Dec. 5, 1990

Related U.S. Application Data

[63] Continuation of Ser. No. 333,715, Apr. 3, 1989, abandoned, which is a continuation of Ser. No. 8,348, Jan. 29, 1987, abandoned.

[51] Int. Cl.$^5$ .................. E21B 43/25; E21B 43/24
[52] U.S. Cl. .................. 252/8.554; 252/8.551
[58] Field of Search .................. 252/8.551, 8.554

[56] References Cited

U.S. PATENT DOCUMENTS

| | | | |
|---|---|---|---|
| 3,396,792 | 8/1968 | Muggee | 166/303 |
| 3,415,753 | 12/1965 | Stein et al. | |
| 3,686,098 | 8/1972 | Weil | |
| 3,721,707 | 3/1973 | Straus et al. | |
| 3,811,505 | 5/1974 | Fluornoy et al. | 166/274 |
| 3,869,412 | 3/1975 | Waag | 252/321 X |
| 4,086,964 | 5/1978 | Dilgren et al. | 166/272 |
| 4,115,437 | 9/1978 | Matsuda et al. | 252/555 X |
| 4,161,217 | 7/1979 | Dilgren et al. | 166/272 |
| 4,186,114 | 1/1980 | Nakamura et al. | 252/536 |
| 4,239,052 | 12/1980 | McClaflin | 252/8.551 X |
| 4,265,264 | 5/1981 | Sifferman | 252/8.551 X |
| 4,306,981 | 12/1981 | Blair | 252/358 X |
| 4,316,808 | 2/1982 | Blair | 252/8.554 |
| 4,342,657 | 8/1982 | Blair | 252/331 |
| 4,393,937 | 7/1983 | Dilgren et al. | 252/8.554 X |
| 4,446,054 | 5/1984 | Bessler | 252/358 X |
| 4,532,993 | 8/1985 | Dilgren et al. | 166/303 |
| 4,534,411 | 8/1985 | Morita et al. | 166/274 X |
| 4,556,107 | 12/1985 | Duerksen et al. | 252/8.554 X |
| 4,570,656 | 2/1986 | Matlach et al. | 252/8.551 X |
| 4,743,385 | 5/1988 | Angstadt et al. | 252/8.554 |
| 4,763,730 | 8/1988 | Suzuki | 166/273 |
| 4,814,094 | 3/1989 | Blair, Jr. et al. | 252/8.554 |
| 4,820,429 | 4/1989 | Lim | 252/8.554 |

*Primary Examiner*—Robert L. Stoll
*Assistant Examiner*—C. Sayala
*Attorney, Agent, or Firm*—Burns, Doane, Swecker & Mathis

[57] ABSTRACT

A composition for, and an improved process of, enhancing petroleum recovery from a petroleum reservoir by injecting into the reservoir a surfactant composition which includes at least one anionic surfactant component and a non-ionic surfactant component in which the components are proportioned to synergistically decrease the viscosity of emulsions in the reservoir over the effect of either component alone.

22 Claims, No Drawings

ENHANCED OIL RECOVERY METHOD USING SURFACTANT COMPOSITIONS FOR IMPROVED OIL MOBILITY

This application is a continuation of application Ser. No. 07/008,348, filed Jan. 29, 1987 now abandoned. This application is a continuation of application Ser. No. 07/333,715, filed Apr. 3, 1989 now abandoned.

FIELD OF THE INVENTION

The present invention relates to enhanced oil recovery for petroleum-bearing formations. More particularly, it relates to an improved method of stimulating, or driving, petroleum from such a reservoir formation wherein oil and water emulsions are present, either naturally or as a result of fluid injection into the reservoir.

Emulsions frequently occur in petroleum reservoirs due to the presence of water, oil, and surfactants including natural surfactant components in the petroleum. Injection of other fluids such a water, steam or gas also cause mixing and can increase the amount of emulsion present. Such fluids co-act with formation fluids (oil, gas or water) and form emulsions of increased viscosity relative to the other formation fluids. The presence of these viscous emulsions may seriously impair the mobility of oil flowing from the reservoir. As used herein "emulsions" includes mixtures of oil and water or other fluids which, when mixed together, have a viscosity that exceeds either fluid alone.

Accordingly, this invention more particularly relates to improving the mobility of oil in a reservoir formation containing such emulsions by reducing their viscosity.

It is a particular object of this invention to inject through a well bore into a petroleum-bearing formation a new surfactant composition of selected ratios of a non-ionic surfactant component and an anionic surfactant compound. Such combination has been found to be more effective to reduce the viscosity of such crude oil emulsions that either non-ionic surfactants or anionic surfactants injected alone into the reservoir.

In qualitative terms, the new surfactant composition is based on the discovery that relatively minor amounts of such a composition of an anionic surfactant component, such as an alpha olefin sulfonate dimer (AOSD), and a non-ionic surfactant, injected into a reservoir substantially reduces the viscosity of the oil containing emulsion. Accordingly, the composition of the present invention permits enhanced recovery of petroleum from a reservoir formation by reducing the viscosity of the oil. Thus, at the same temperature and pressure, oil is able to flow from the formation into the producing well at a higher rate or at the same rate at substantially lower temperature or pressure differences. Alternatively stated, the composition is one in which a non-ionic surfactant component, normally introduced to inhibit or break an emulsion of water and oil in such a formation, is substantially enhanced by the addition thereto of an anionic surfactant composition, such as an alpha olefin sulfonate dimer (AOSD) component to thereby (1) reduce viscosity of emulsions, whether or not broken and (2) make such non-ionic surfactants, normally hydrophobic at reservoir conditions, soluble in steam or water so that they are transported by the injected fluid and thereby improve control of emulsions away from the well bore.

Further, the present invention is particularly distinguished from my prior application Ser. No. 848,126, filed Apr. 4, 1986, in that the composition is useful whether or not foam is formed in the formation. Further, it is applicable to any producing well, whether or not other drive fluids are used, including water or gas normally used for assisted oil recovery. It is also useful in stimulation of a single well, by injection of fluid into such a single well and then subsequently producing petroleum from the same well.

In a preferred method of carrying out the present invention, a water solution of AOSD and a non-ionic surfactant is injected into a well in proportions which reduce the viscosity of emulsions or oils produced from the formation to a substantially greater extent than by use of either surfactant alone. In particular, the method of the invention is based on the discovery that viscosity reduction rather than breaking or inhibiting formation of emulsions by a non-ionic surfactant, as used in the prior art, is synergistically enhanced when used in combination with an anionic surfactant.

BACKGROUND OF THE INVENTION

In normal oil wells, emulsions frequently form, simply by mechanical mixing of reservoir water and oil. Such emulsions generally have a higher viscosity, or resistance to flow into the well bore, and the emulsions accordingly tend to reduce production of oil into or from the well. In enhanced oil recovery from a petroleum reservoir formation by injection fluids frequently form emulsions in the formation. Such emulsions result from the mixture of injected fluids and connate water and oil in the reservoir. Where oil production is from fields of relatively high gravity, such as many California fields, the addition of steam, gas or water as a flooding fluid frequently results in additional emulsification.

It has long been known that certain surface active materials, especially non-ionic surfactants, are effective to break emulsions, particularly after production, as in surface treating of produced fluids. They are also helpful in increasing productivity from a well or in maintaining fluid flow through a formation to the extend that the emulsion is broken.

Almost all earth formations forming petroleum reservoirs are created by sedimentary deposition with subsequent compaction or crystallization of the rock matrix. Such deposition of detrital materials, with varying composition and over extensive geological times, occurs at varying rates. The resulting compacted rocks in which petroleum accumulates are permeable, but in general are heterogeneous. Accordingly, the petroleum reservoir formed by such rock formations are inherently inhomogeneous as to both porosity and permeability for fluid flow, either native (connate) or injected fluids. Furthermore, flow permeability for connate gas, oil and water is substantially different for each liquid or mixture thereof. A particular feature of such inhomogeneity of sedimentary rock formations appears to be their shale or clay content and the susceptibility of such clay to alteration when contacted by water and particularly when such water is injected as steam. In general, clays have large surface area to volume ratios and tend to affect adversely contact between connate oil and reservoir rock. Most specifically, they adversely affect viscous oils containing organo-metallic and acidic components which are particularly susceptible to enhanced oil recovery by steam or gas injection. However, it is also known that either or both of such reservoir conditions may promote formation of viscous emulsions that inhibit or reduce the flow of oil to the producing well. Hence, there is a need for surfactant compositions which reduce the viscosity of emulsions in such formations.

This invention is an improvement over prior methods of using surfactant compositions to enhance petroleum production from oil-bearing formations. Many of these are mentioned and discussed in U.S. Pat. No. 4,086,964. Others include U.S. Pat. Nos. 4,393,937, 4,532,993 and 4,161,217.

SUMMARY OF THE INVENTION

A surfactant composition useful for coacting with emulsions in a petroleum reservoir which includes at least two surfactant components, one of said components being an anionic surfactant and the other of said components being a non-ionic surfactant and wherein the ratio of said components is selected to reduce the viscosity of the emulsion in a petroleum reservoir to near that or less than that of the oil phase alone.

In a preferred form, the viscosity reducing composition includes an anionic surfactant component which are aliphatic sulfonates, or mixtures thereof. Preferably, the non-ionic surfactant component is in the form of a polyether, or a mixture of polyethers. The composition may be injected into a producing formation, either intermittently or continuously, and either in a water solution, or as an additive with another injection fluid, (water, steam or gas).

In a preferred form, the anionic surfactant is an alpha-olefin sulfonate dimer having from 10 to 60 carbon atoms, preferably 15 to 45 and most preferably 20 to 36.

Further, in a preferred form, the non-ionic surfactant component is a polyether surfactant which includes both polyol ethers and phenolic resins having the formula:

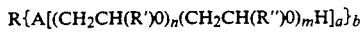

where in R is a mono- or a polyfunctional hydrocarbon that may contain alkyl, aromatic, alkylaromatic, ester, amide, hydroxy, or other functional groups therein A is —O—, —S—, or —NH—, (where a is 1), or

(where a is 2), or mixtures thereof

R' is an alkyl group containing 1 to 4 carbon atoms or mixtures thereof

R" is hydrogen, methyl or mixtures thereof, n is from 2 to 50, m is from 2 to 50, and b is from 1 to 30.

In a preferred form, the polyether surfactant is a polyol ether in accordance with the above formula wherein R is a 2 or 3 carbon difunctional alkyl group (i.e., b is 2 or 3)

A is oxygen (a is 1)

R' is methyl

R" is hydrogen n is 5 to 30 and m is 5 to 30.

In another preferred form, the polyether surfactant is a phenolic resin wherein R is a tri- to eicosafunctional alkyl aromatic formaldehyde oligomer with 4 to 9 carbon atoms in the alkyl group and b is from 3 to 20.

In a most preferred form the polyether surfactant formula is a polyol ether wherein R is —(CH$_2$CH(CH$_3$))— (b=2)

A is oxygen (a=1)

R' is methyl

R" is hydrogen n is from 8 to 20 and m is from 8 to 20.

Additionally in a preferred form, the oxide groups (CH$_2$CH(R')O)n and (CH$_2$CH(R")O)$_m$ are respectively derived from propylene oxide and ethylene oxide. Preferably, the ethylene oxide: propylene oxide mole ratio is between 1:10 and 1:0.1. Most particularly, such ratio is between 1:3 to 1:0.3. In a further preferred form of the polyether surfactant, the polymer contains from 4 to 400 ether groups.

Optionally, the polyether surfactant may be further reacted with a di- or poly-functional acid, examples being maleic or adipic acid. These products are called polyol esters.

Methods of preparing polyol ethers which are polyether non-ionic surfactants, suitable for the practice of the present invention are disclosed in U.S. Pat. No. 4,046,702, issued Sep. 6, 1977.

In accordance with the composition of matter aspects, the anionic surfactant component comprises from 20 to 90, preferably 30 to 70, weight percent of the total surfactant composition. The remainder of the active components of the surfactant composition is the non-ionic component.

Further in accordance with the composition of matter aspects of the present invention a concentrate comprising the anionic surfactant component and the non-ionic component is prepared by mixing the two components in a conventional manner. In a preferred form the concentrate may be prepared as follows The surfactant product of U.S. Pat. No. 3,721,707 called alpha olefin sulfonate dimer (AOSD) is a solution containing from 20% to 90%, preferably 30 to 70%, most preferably from 35 to 50%, by weight of active material. This aqueous product is mixed with an essentially pure polyether compound to produce a concentrate useful for shipping. The ratio of AOSD (active) to polyether is in the range of 1:3 to 1:0.3. This concentrate is readily diluted with reservoir compatible water to the desired concentration at the well site for injection alone or in other fluids such as steam, water or gas.

In another aspect, the invention is characterized by the injected composition containing at least one non-ionic surfactant and at least one anionic surfactant reacting with reservoir fluids to reduce the viscosity of emulsions formed by such fluids to a substantially greater extent than by reaction with such fluids by either of the anionic or non-ionic surfactant components alone.

Further objects and advantages of the present invention will become apparent from the following detailed description, the preferred embodiments of methods and compositions in practice of such methods.

DESCRIPTION OF THE INVENTION

The present invention is, at least in part, based on the discovery that non-obvious and beneficial advantages are obtained by using a composition of matter which includes a combination of surfactant components for viscosity reduction in a petroleum reservoir. The essential feature of such a composition of matter is a synergistic combination of surface active components which includes at least one anionic surfactant component and at least one non-ionic surfactant component which together reduce the viscosity of an emulsion that has been, or may be, formed in the reservoir.

Such action at relatively low concentration of surfactant in injection water or steam substantially increases the mobility of emulsions through the reservoir permeability channels. And because such surfactant composition is hydrophilic, the viscosity control effect may be extended outwardly into the formation from an injection well to improve mobility of emulsions toward a recovery well or to return to the same well, as in well stimulation. Further, the increase in emulsion mobility is independent of breaking the emulsion.

The present invention is particularly directed to including the viscosity reducing surfactant with an injection fluid, such as steam. A specific example of such use of surfactants with steam is shown and described in my copending application Ser. No. 848,126. The disclosure of that application is incorporated by reference in this specification. As therein described, steam is injected to heat the petroleum and thereby reduce its viscosity. The steam may also increase pressure in the formation to enhance the natural gas or stratigraphic pressures to increase petroleum flow into the same, or an adjacent, well penetrating the formation. However, such steam without such surfactants, and even naturally occurring surfactants in the petroleum may generate emulsions in the reservoir. Steam is typically generated in a single-pass, continuous boiler tube. The water supply for steam also typically includes minerals and salts which replicate, or are compatible with, connate water in the formation. Desirably, water passes through a "water softener" or ion exchange medium, an is heated in the boiler tubes sufficiently to form a low quality or "wet" steam, preferably having a quality of less than 80%. Such steam is injected into a well through the well head and a pipe string spaced by centralizers from the well casing to prevent loss of heat from the steam to earth formations along its length to the desired injection depth, into earth formation forming a petroleum reservoir.

Foam forming surfactants frequently are added to the injected steam to control the injection profile by partially or temporarily plugging the more permeable gas channels through the reservoir. This action directs heat from the steam to the oil-rich, lower gas permeable portions of the reservoir. However, such foam forming surfactants are among numerous sources of emulsion forming components which include natural surfactants in the reservoir petroleum itself. Such emulsions are particularly troublesome in that they reduce flow of reservoir fluids back to the injection wells or to adjacent producing wells.

Many other assisted recovery processes inject surfactants along with water, gas or steam to reduce viscosity or improve mobility of oil through the permeability channels of a reservoir formation. Additionally, emulsions are frequently formed within the reservoir fluids by conventional well completion or pumping operations. Such emulsions not only inhibit or reduce flow in the reservoir, but also require removal from the produced fluids to permit saleable oil to be gauged and transported to a refinery. Many different anionic surfactants have been employed to enhance oil production from petroleum reservoirs and other non-ionic surfactants have been used to inhibit or break formation of emulsions formed in such reservoirs. In general, the surfactants for such functions are not necessarily compatible, but as disclosed in my prior application, certain anionic and non-ionic surfactants may be combined to perform both functions without either inhibiting the other.

The present invention is particularly directed to the discovery that when certain anionic and non-ionic surfactants are combined, the mobility of reservoir fluids is enhanced, whether or not an emulsion is broken, and such mobility is enhanced to a greater extent than by injecting either type of surfactant alone.

As described below, the combination of anionic and non-ionic compositions to reduce viscosity may be determined by measurement of their interaction with crude oil emulsions formed by oil and water from any selected well or by treatment of recovered emulsions from the well. However, particular anionic surfactants and particular non-ionic surfactants have been found to be highly effective for viscosity reduction of petroleum, including emulsions.

The compositions of the anionic surfactants which improve such mobility when mixed with non-ionic surfactants, in accordance with my discovery, are particularly characterized as being alkyl sulfonates, as distinguished from alkyl aromatic sulfonates. More particularly, alpha olefin sulfonate dimers have been found to be preferable. Such alpha olefin sulfonate dimers are disclosed in U.S. Pat. No. 3,721,707 and the disclosure of that patent is incorporated in full into this disclosure by this reference. As therein disclosed, such anionic surfactants are alpha-olefin sulfonate dimers having from 10 to 60 carbon atoms, preferably 15 to 45, and most preferably 20 to 36. Most preferably, the alpha olefin sulfonate dimer is prepared from an alpha olefin containing 12 to 18 carbon atoms.

In general, non-ionic surfactants that are useful in the combinations according to the present invention are generally called polyether surfactants which include polyol ethers, polyol esters, and phenolic resins. The polyol ether and phenolic resin surfactants of these classes are defined by the formula:

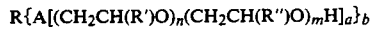

where in R is a mono- or a polyfunctional hydrocarbon that may contain alkyl, aromatic, alkylaromatic, ester, amide, hydroxy, or other functional groups therein A is —O—, —S—, or —NH—, where a is 1; or A is

where a is 2; or mixtures thereof,

R' is an alkyl group containing 1 to 4 carbon atoms or mixtures thereof,

R" is hydrogen, methyl or mixtures thereof, n is from 2 to 50, m is from 2 to 50, and b is from 1 to 30.

Species of the above generalized formula are:

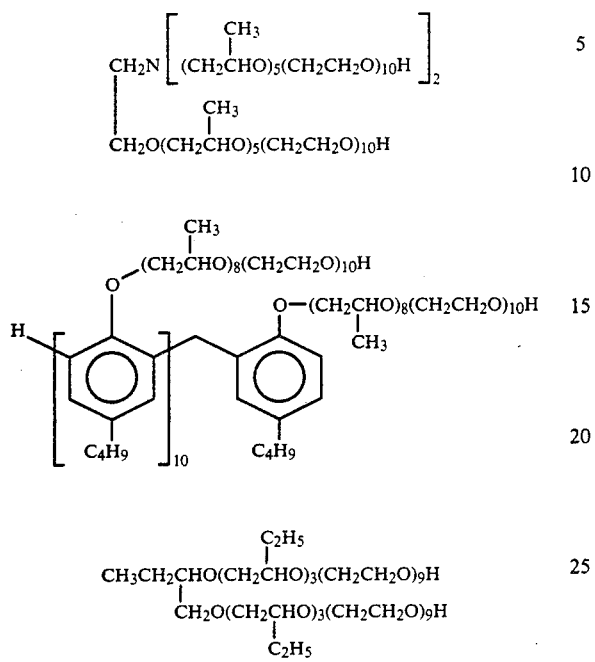

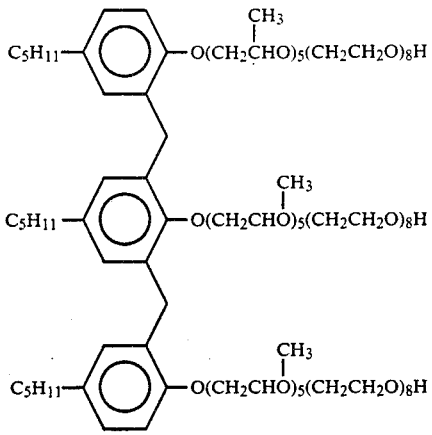

In one preferred form of the composition with the above-noted general formula, the non-ionic polyether surfactant is called a polyol ether wherein R is a 2 or 3 carbon difunctional alkyl group (i.e., b is 2 or 3)

A is oxygen (i.e., a is 1)

R' is methyl

R" is hydrogen n is 5 to 30 and m is 5 to 30.

Species of such polyol ethers of this form are:

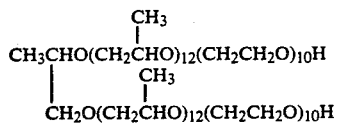

In another preferred form, and in accordance with the general formula, the nonionic polyether surfactant is a phenolic resin wherein R is a tri- to eicosafunctional alkyl aromatic formaldehyde oligomer with 4 to 9 carbon atoms in the alkyl group and the degree of oligomerization is 3 to 20, (i.e., b is from 3 to 20).

Species of phenolic resins of this form are:

In a most preferred form the polyol ether is in the form of the above-noted formula wherein R is —(CH$_2$CH(CH$_3$))— (b=2)

A is oxygen (a=1)

R$^1$ is methyl

R$^{11}$ is hydrogen n is from 8 to 20 and m is from 8 to 20.

Specific species of such polyol ethers within the formula are:

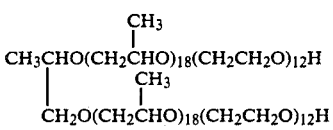

Further, the polyether surfactants in accordance with the above formula can be further reacted to give polyol esters. The reaction may be with di- or polyfunctional agents, such as acids, to give polyol esters.

VISCOSITY TEST

The effectiveness of surfactant compositions formulated in accordance with the present invention to improve the mobility of emulsions through the permeability channels of an earth formation forming the reservoir have been elucidated by the following Viscosity Test procedure:

The viscosity reducing function of enhanced oil recovery surfactant compositions can be demonstrated by measuring the viscosity of untreated wellhead emulsion in a Brookfield viscometer at near reservoir temperature. Such measurement of the untreated emulsion is interrupted and the surfactant composition to be evaluated is added. The new viscosity in centipoise, cP is recorded against time or, for convenience, the viscosity after a suitable time can be recorded. For each comparison, the viscosity of the emulsion is also measured after adding only water. Large viscosity reductions are desirable as the amount of oil producible with such reduction by adding surfactant is a strong inverse function of its viscosity. Viscosity reduction without bulk demulsification is possible as the surfactant composition can alter the interfacial properties, droplet size, etc. of the oil/water mixture. These changes may or may not lead to bulk demulsification but, because the overall viscosity is reduced, lead to increased oil production.

EXAMPLES

Following are examples of particular tests of surfactants used to demonstrate the effectiveness of compositions prepared in accordance with the present invention and their application to the methods of enhancing oil recovery employing such compositions.

EXAMPLE 1

The viscosity reduction of a crude oil emulsion produced from California's Midway-Sunset Field Potter Sand was determined as follows. The viscosity of a homogeneous sample of emulsion containing 38% water was determined in a Brookfield viscometer operating at 50 rpm and 194.F. After about 10 to 20 minutes when the viscosity had stabilized, the measurement was interrupted and a water solution of surfactants was added with stirring. The total volume of water added was about 3% to 8% of the total. Surfactant concentration in the emulsion ranged from about 45 to 300 ppm as noted in Table 1. After surfactant addition, the viscosity measurement was resumed. Table 1 records the emulsion viscosity 96 minutes after surfactant addition for a number of anionic-non-ionic surfactant mixtures as well as the viscosity when only water is added for reference. Viscosity reduction using only anionic or only non-ionic surfactants, also shown for comparison, particularly illustrate the synergistic effect of the combination. Properties of the non-ionic surfactants are shown in Table 2.

TABLE 1

| Surfactant (ppm) | Viscosity of 96 minutes, cP |
| --- | --- |
| 1. None - Control | 120 |
| 2. AOSD (300) (Anionic only) | 113 |
| 3. PEt-1 (45) (Non-ionic only) | 121 |
| 4. AOSD (45), PEt-1 (45) | 109 |
| 5. AOSD (90), PEt-1 (45) | 102 |
| 6. AOSD (135), PEt-1 (45) | 88 |
| 7. PEt-1 (23), PEs-1 (23) (Non-ionic only) | 132 |
| 8. AOSD (45), PEt-1 (23), PEs-1 (23) | 103 |
| 9. AOSD (90), PEt-1 (23), PEs-1 (23) | 93 |
| 10. AOSD (75), PEt-1 (75) | 81 |
| 11. AOSD (100), PEt-1 (50) | 84 |
| 12. AOSD (50), PEt-1 (50) | 91 |
| 13. AOSD (75), PEt-1 (38), PEs-1 (38) | 79 |

TABLE 2

| NON-IONIC | VISCOSITY | WATER SOLUBLE* |
| --- | --- | --- |
| PEt-1 | 490 | YES |
| PEt-2 | 550 | YES |
| PEt-3 | 450 | YES |
| PEt-4 | 898 | YES |
| PEs-1 | 1200 | NO |
| PRe-1 | 790 | NO |
| PRe-2 | SOLID | YES |
| PEI-1 | 15,500 | NO |

PEt= POLYOL ETHER
PEs= POLYOL ESTER
PRe= PHENOLIC RESIN
PEI= POLYETHYLENEIMINE
VISCOSITY IS AT 25°
*AT ROOM TEMPERATURE

EXAMPLE 2

A series of surfactant formulations containing anionic and non-ionic surfactants were prepared as shown in Table 3. The anionic surfactant was an alpha olefin sulfonate dimer prepared according to U.S. Pat. No. 3,721,707 which was available as a 40% solution in water. The non-ionic surfactants have the properties shown in Table 2. Generally, the non-ionic surfactant could be added directly to the 40% active AOSD solution and dissolved with gentle mixing.

TABLE 3

| COMPOSITION | SURFACTANT (% ACTIVE) | | |
| --- | --- | --- | --- |
| A | AOSD (30) | PEt-1 (15) | PEs-1 (15) |
| B | AOSD (30) | PEt-1 (20) | PRe-1 (10) |
| C | AOSD (30) | PEt-1 (24) | PEI-1 (6) |
| D | AOSD (30) | PEt-1 (15) | PEt-4 (15) |
| E | AOSD (30) | PEs-1 (15) | PEt-4 (15) |
| F | AOSD (30) | PEt-4 (30) | |
| G | AOSD (30) | PEt-1 (15) | PRe-2 (15) |
| H | AOSD (30) | PEt-2 (30) | |
| I | AOSD (30) | PEt-1 (15) | PEt-2 (15) |
| J | AOSD (30) | PEt-1 (15) | PEt-3 (15) |
| K | AOSD (30) | PEt-2 (15) | PEt-3 (15) |
| L | AOSD (30) | PEt-1 (10) | PEt-2 (10) PEt-3 (10) |
| M | AOSD (30) | PEt-1 (30) | |

EXAMPLE 3

The surfactant compositions of Example 2 were used to reduce the viscosity of crude oil emulsions from three California oil field: Midway-Sunset Section 15A, McKittrick Section 11Y, and Poso Creek Section 9. The procedure of Example 1 was followed. Results are shown in Table 4. The results of a control experiment are also shown for comparison, where water, but no surfactants, was added to the emulsions.

TABLE 4

| | | VISCOSITY AFTER 96 MINUTES, cP | | |
| --- | --- | --- | --- | --- |
| COMPOSITION | CONC. (ppm) | MIDWAY-SUNSET | McKittrick | POSO CREEK |
| A | 50 | 116 | | |
| A | 100 | 95 | 139 | 141 |
| A | 150 | 85 | | |
| B | 100 | 94 | 123 | |
| C | 100 | 96 | 115 | |
| D | 100 | 85 | 108 | |
| E | 100 | 83 | 118 | |
| F | 100 | 77 | 101 | |
| G | 100 | 89 | 105 | |
| H | 100 | 88 | 132 | |
| I | 50 | 112 | | |
| I | 100 | 89 | 119 | 114 |
| I | 150 | 86 | | |
| J | 100 | 90 | 140 | 139 |
| K | 100 | 95 | 145 | 120 |
| L | 100 | 94 | 143 | 120 |

TABLE 4-continued

| COMPOSITION | CONC. (ppm) | VISCOSITY AFTER 96 MINUTES, cP | | |
|---|---|---|---|---|
| | | MIDWAY-SUNSET | McKittrick | POSO CREEK |
| M | 100 | 91 | 118 | |
| CONTROL (No Surfactant) | 0 | 120 | 228 | 189 |

EXAMPLE 4

For comparison, a series of surfactant formulations were prepared with common anionic surfactants other than AOSD. The non-ionic components were taken from Table 2. The compositions are shown in Table 5. ENORDET is a trademark of the Shell Chemical Company. ENORDET LXS 1112 is an alkyl aromatic sulfonate and ENORDET AES 1215-3A is an alcohol ethoxy sulfate. STEPANFLO 30 is an alpha olefin sulfonate sold by Stepan Chemical Company. ALIPAL CD128 is an alcohol ethoxy sulfate sold by the GAF Corporation.

TABLE 5

| COMPOSITION | SURFACTANT (parts by weight) |
|---|---|
| N | ENORDET LXS 1122 (0.5), PEt-1 (0.5) |
| O | ENORDET AES 1215-3A (0.5), PEt-1 (0.25), PEt-2 (0.25) |
| P | STEPANFLO 30 (0.5), PEt-1 (0.25), PEs-1 (0.25) |
| Q | ALIPAL CD128 (0.5), PEt-1 (0.25), PEt-2 (0.25) |

EXAMPLE 5

For comparison, the viscosity reducing performance of the surfactant compositions of Example 4 containing common anionic surfactants was compared with that of the surfactant compositions of Example 2 containing AOSD. For each of the four surfactant comparisons, the only difference is the anionic surfactant. Results for two crude oil emulsions are shown in Table 6.

TABLE 6

| COMPOSITION | ANIONIC | VISCOSITY AFTER 96 MINUTES, cP | |
|---|---|---|---|
| | | McKITTRICK | POSO CREEK |
| 1. M | AOSD | 118 | |
| N | ENORDET LXS 1112 | 191 | |
| 2. I | AOSD | 119 | 114 |
| O | ENORDET AES 1215-3A | 188 | 164 |
| 3. A | AOSD | 139 | 141 |
| P | STEPANFLO 30 | 201 | 171 |
| 4. I | AOSD | 119 | 114 |
| O | ALIPAL CD128 | 203 | 183 |

I claim:

1. A surfactant composition useful for coacting with an emulsion in a petroleum reservoir which includes at least two surfactant components, one of said components being an anionic surfactant and the other of said components being a non-ionic polyether surfactant which is selected from among polyol ethers, polyol esters and phenolic resins, wherein the anionic surfactant comprises an alpha olefin sulfonate dimer having from 15 to 45 carbon atoms, wherein the ratio of said components is selected to reduce the viscosity of an emulsion in a petroleum reservoir to near, or less than, the viscosity of the oil phase alone and wherein the anionic surfactant component is from 30 to 70 weight percent of the total surfactant composition.

2. A surfactant composition in accordance with claim 1 wherein said alpha olefin sulfonate dimer is prepared from an alpha olefin containing from 12 to 18 carbon atoms.

3. A surfactant composition in accordance with claim 1 wherein said polyether surfactant is a compound of the formula:

$$R\{A[(CH_2CH(R')O)_n(CH_2CH(R'')O)_mH]_a\}_b$$

where in R is a mono- or a polyfunctional hydrocarbon that may contain alkyl, aromatic, alkylaromatic, ester, amide, hydroxy, or other functional groups therein A is —O—, —S—, or —NH—, where a is 1; or A is

where a is 2; or mixtures thereof,

R' is an alkyl group containing 1 to 4 carbon atoms or mixtures thereof

R'' is hydrogen, methyl or mixtures thereof, n is from 2 to 50, m is from 2 to 50, and b is from 1 to 30.

4. A surfactant composition in accordance with claim 3 wherein said polyether surfactant is a polyol ether in which R is a 2 or 3 carbon difunctional alkyl group (i.e., b is 2 or 3), A is oxygen (a=1), R' is methyl, R'' is hydrogen, n is 5 to 30, and m is 5 to 30.

5. A surfactant composition in accordance with claim 3 wherein said polyether surfactant is a phenolic resin in which R is a tri- to eicosafunctional alkyl aromatic formaldehyde resin with 4 to 9 carbon atoms in the alkyl group and b is from 3 to 20.

6. A surfactant composition in accordance with claim 3 wherein

R is —(CH$_2$CH(CH$_3$)— (b=2)

A is oxygen (a=1)

R' is methyl

R'' is hydrogen n is from 8 to 20 and m is from 8 to 20.

7. A surfactant composition in accordance with claim 3 wherein said polyether surfactant is a block copolymer of ethylene oxide and propylene oxide and the ethylene oxide: propylene oxide mol ratio is between 1:10 and 1:0.1 in said mixture.

8. A surfactant composition in accordance with claim 12 wherein said ethylene oxide: propylene oxide mol ratio is between 1:3 and 1:0.3.

9. A surfactant composition in accordance with claim 3 wherein the polyether surfactant is reacted with a di- or polyfunctional acid to give a polyol ester surfactant.

10. A surfactant composition in accordance with claim 1 wherein the ratio of said anionic surfactant component to said non-ionic component is from about 1:3 to about 1:0.3.

11. A surfactant composition in accordance with claim 1 wherein said composition is a concentrate containing from 30% to 82% active ingredients.

12. A surfactant composition useful for improving the mobility of oil flow from a petroleum reservoir into a producing well after injection into said petroleum reservoir as a solution, said surfactant solution containing anionic and non-ionic polyether surfactant components, wherein said components are mixed together for injection into said reservoir in proportions such that the combined action of said components in said reservoir in reducing the viscosity of said oil is substantially greater than the change in the viscosity of said oil mixed with a solution of ether component alone, wherein the anionic surfactant comprises an alpha olefin sulfonate dimer having from 15 to 45 carbon atoms, the nonionic surfactant is selected from among polyol ethers, polyol esters and phenoic resins, and wherein the anionic surfactant component is from 30 to 70 weight percent of the total surfactant composition.

13. A surfactant composition in accordance with claim 12, wherein said alpha olefin sulfonate dimer is prepared from an alpha olefin containing from 12 to 18 carbon atoms.

14. A surfactant composition in accordance with claim 12 wherein said polyether surfactant is a compound of the formula:

$$R\{A[(CH_2CH(R')O)_n(CH_2CH(R'')O)_mH]_a\}_b$$

where in R is a mono- or a polyfunctional hydrocarbon that may contain alkyl, aromatic, alkylaromatic, ester, amide, hydroxy, or other functional groups therein A is —O—, —S—, or —NH—, where a is 1; or A is

where a is 2; or mixtures thereof,

R' is an alkyl group containing 1 to 4 carbon atoms or mixtures thereof

R'' is hydrogen, methyl or mixtures thereof, n is from 2 to 50, m is from 2 to 50, and b is from 1 to 30.

15. A surfactant composition in accordance with claim 14 wherein said polyether surfactant is a polyol ether in which R is a 2 or 3 carbon difunctional alkyl group (i.e., b is 2 or 3), A is oxygen (a=1), R' is methyl, R'' is hydrogen, n is 5 to 30, and m is 5 to 30.

16. A surfactant composition in accordance with claim 14 where said polyether surfactant is a phenolic resin wherein R is a tri- to eicosafunctional alkyl aromatic formaldehyde resin with 4 to 9 carbon atoms in the alkyl group and b is from 3 to 20.

17. A surfactant composition in accordance with claim 14 wherein

R is —(CH$_2$CH(CH$_3$)— (b=2)

A is oxygen (a=1)

R' is methyl

R'' is hydrogen n is from 8 to 20 and m is from 8 to 20.

18. A polyether surfactant composition in accordance with claim 14, wherein the said surfactant is further reacted with a di- or polyfunctional acid to give a polyolester surfactant.

19. A surfactant composition in accordance with claim 12 wherein said polyether surfactant is a block copolymer of ethylene oxide and propylene oxide and the ethylene oxide: propylene oxide mol ratio is between 1:10 and 1:0.1 in said mixture.

20. A surfactant composition in accordance with claim 19 wherein said ethylene oxide: propylene oxide mol ratio is between 1:3 and 1:0.3.

21. A surfactant composition in accordance with claim 12 wherein the ratio of said anionic surfactant component to said non-ionic component is from about 1:3 to about 1:0.3.

22. A surfactant composition in accordance with claim 12 wherein said composition is a concentrate containing from 35 to 50 weight percent of active ingredients.

* * * * *